(12) United States Patent  
Vandor (10) Patent No.: US 7,947,240 B2
(45) Date of Patent: May 24, 2011

(54) SYSTEM AND METHOD OF CARBON CAPTURE AND SEQUESTRATION (75) Inventor: David Vandor, Tarrytown, NY (US)

(73) Assignee: Expansion Energy, LLC, Tarrytown, NY (US)

( * ) Notice: Subject to any disclaimer, the term of this patent is extended or adjusted under 35 U.S.C. 154(b) by 135 days.

(21) Appl. No.: 12/247,902

(22) Filed: Oct. 8, 2008

(65) Prior Publication Data

US 2010/0084256 A1 Apr. 8, 2010

(51) Int. Cl.
*B01D 53/62* (2006.01)
*B01D 53/14* (2006.01)
*B01D 35/18* (2006.01)
*B01D 17/09* (2006.01)
*F25J 1/02* (2006.01)
*F25J 3/00* (2006.01)

(52) U.S. Cl. ........ 423/225; 423/210; 423/220; 423/226; 423/230; 210/175; 210/176; 210/767; 210/774; 210/775; 210/908; 95/39; 62/115; 62/606; 62/617

(58) Field of Classification Search .................. 423/220, 423/225, 226, 230; 210/908, 175, 176, 737, 210/767, 774, 775; 95/39; 62/115, 606, 62/617
See application file for complete search history.

(56) References Cited

U.S. PATENT DOCUMENTS

| | | | | |
|---|---|---|---|---|
| 2,956,018 A * | 10/1960 | Carlyle et al. | ................ | 508/395 |
| 3,436,347 A * | 4/1969 | Herd et al. | ..................... | 508/393 |
| 3,579,293 A * | 5/1971 | Schultz et al. | ................ | 423/231 |
| 4,112,050 A | 9/1978 | Sartori et al. | | |
| 4,313,916 A | 2/1982 | Jones et al. | | |
| 5,000,930 A * | 3/1991 | Boguslawski | ............. | 423/239.1 |
| 5,100,635 A | 3/1992 | Krishnamurthy et al. | | |
| 6,436,174 B1 | 8/2002 | Grossmann et al. | | |
| 7,132,090 B2 | 11/2006 | Dziedzic et al. | | |
| 2005/0238563 A1 * | 10/2005 | Eighmy et al. | ................ | 423/432 |
| 2007/0148069 A1 | 6/2007 | Chakravarti et al. | | |
| 2008/0031801 A1 | 2/2008 | Lackner et al. | | |
| 2008/0099400 A1 * | 5/2008 | Nemser et al. | ................ | 210/638 |
| 2009/0001020 A1 | 1/2009 | Constantz et al. | | |
| 2009/0020044 A1 | 1/2009 | Constantz et al. | | |
| 2009/0305378 A1 * | 12/2009 | Brent | ............................ | 435/168 |

FOREIGN PATENT DOCUMENTS

| CN | 1184524 C | 6/1998 |
|---|---|---|
| JP | 2002-273163 A | 9/2002 |
| WO | WO2008/018928 | 2/2008 |

OTHER PUBLICATIONS

Esp@cenet Patent Family list for WO 2008/061305, published May 29, 2008.*

(Continued)

*Primary Examiner* — Stuart Hendrickson
*Assistant Examiner* — Daniel Berns
(74) *Attorney, Agent, or Firm* — Eric L. Lane; Luce, Forward, Hamilton & Scripps LLP (57) ABSTRACT

Systems and methods of capturing and sequestering carbon dioxide, comprising mixing a substantially non-aqueous solvent and an alkali such that the solvent and alkali form a solvent suspension, mixing water and a flue gas containing carbon dioxide with the solvent suspension such that a reaction occurs, the reaction resulting in the formation of a carbonate, water and heat.

20 Claims, 4 Drawing Sheets

OTHER PUBLICATIONS

Fly-Ash Concrete, "Nature and Composition." (Mar. 2, 2008). Viewed Nov. 10, 2010 at http://www.flyashconcrete.In/fly_ash/nature_composition.htm.*

Internet archive page for http://www.flyashconcrete.In/fly_ash/nature_composition.htm . Viewed Nov. 10, 2010 at http://web.archive.org/web/*/http://www.flyashconcrete.In/fly_ash/nature_composition.htm .*

Burt et al., "Cryogenic CO2 Capture for Improved Efficiency at Reduced Cost"; Extended Abstract, [retrieved from http://aiche.confex.com/aiche/2010/webprogram preliminary/Paper200484.html on Jan. 3, 2011].

Philip Proefrock, "Cryogenic Carbon Capture Technology Offers Better Capture at Lower Cost", Ecogeek, Nov. 18, 2010 [retrieved from http://www.ecogeek.org/preventing-pollution/3348 on Dec. 2, 2010].

Eric Wesoff, "Skyonic Cleans Up Coal:Update", Greentech Media, Dec. 2, 2010; [retrieved from http://www. greentechmedia.com/articles/print/Skyonic-Cleans-Up-Coal-an-Update/ on Dec. 23, 2010].

Li et al., "Utilization of Carbon Dioxide from Coal-fired Power Plant for the Production of Value-added Products" Apr. 27, 2006; [retrieved from http://moritz.botany.ut.ee/~olli/b/RepYuLi06.pdf on Mar. 24, 2010].

Hsu et al., "Absorption and reaction kinetics of amines and ammonia solutions with carbon dioxide in flue gas.", J. Air Waste Manag Assoc. Feb. 2003; 53(2):246-52; On-line article abstract [retrieved from http://www.ncbi.nlm.nih.gov/pubmed/12617298 on Jul. 22, 2008].

Soong et al., "CO2 Sequestration Via Brine/bauxite Residue Mixture", National Energy Technology Laboratory, U.S. Department of Energy; Nov. 6, 2007; [retrieved from http://aiche.confex.com/aiche/2007/techprogram/P86362.HTM on Mar. 25, 2010].

Dilmore et al., "Sequestration of CO2 in Mixtures of Bauxite Residue and Saline Wastewater", National Energy Technology Laboratory, U.S. Department of Energy, (Published Jan. 1, 2008).

Mani et al., "Combined Process of CO2 Capture by Potassium Carbonate and Production of Basic Zinc(II) Cabonates: CO2 Release from Bicarbonate Solutions at Room Temperature and Pressure", Energy & Fuels, 2008, 22(3), pp. 1714-1719; Published Mar. 28, 2008 (Abstract).

U.S. Department of Energy "Carbon Dioxide Capture by Absorption with Potassium Carbonate", Project Facts; Carbon Sequestration, Apr. 2008.

House et al. "Electrochemical Acceleration of Chemical Weathering as an Energetically Feasible Approach to Mitigating Anthropogenic Climate Change", Environ. Sci Technol., 2007, 41, pp. 8464-8470, published on web on Nov. 7, 2007.

Gupta et al.,CO2 Capture Technologies and Opportunities in Canada; "Strawman Document for CO2 capture and Storage (CC&S) Technology Roadmap"; 1st Canadian CC&S Technology Roadmap Workshop Sep. 18-19, 2003, Calgary, Alberta, Canada, pp. 1-36.

Chen et al., "Critical Review of CO2 Separation Technologies for Post Combustion Flue Gases", Fifth Annual Conference on Carbon Capture & Sequestration; May 8-11, 2006, pp. 1-17.

Huijgen et al., "Mineral CO2 Sequestration in Alkaline Solid Residues", The Seventh International Conference on Greenhouse Gas Control Technologies (GHGT-7), Vancouver, Canada, Sep. 5-9, 2004.

* cited by examiner

SYSTEM AND METHOD OF CARBON CAPTURE AND SEQUESTRATION

FIELD OF THE INVENTION

The present invention relates to carbon capture and sequestration systems and methods.

BACKGROUND

The capture and sequestration of carbon dioxide ($CO_2$) emissions needs to be significantly improved if the climate change consequences of such emissions are to be controlled or curtailed. The $CO_2$ produced from combustion and industrial processes, specifically power plant flue gas, is perhaps the largest single greenhouse gas emission. Most existing carbon capture and sequestration methods take a two-step approach. First, a method is sought for separating $CO_2$ from the flue gas or other gaseous emission source. These may include capture of the $CO_2$ in liquid solvents, solid zeolyte or various membranes. However, the capture media need to be regenerated without releasing the $CO_2$ into the atmosphere, and this is difficult to achieve in standard physical separation processes.

The second step is sequestering the $CO_2$ gas or liquid by inserting it into underground geological formations or in deep ocean layers. However, very specific geological configurations are required for disposal of the $CO_2$, and these are not commonly available at $CO_2$ emission sites. Thus, transportation adds substantial cost and difficulty. In addition, it is not known whether $CO_2$ can be permanently sequestered underground. The two-step approach also is not economical because often $CO_2$ represents only a small percentage of a large volume of flue gas, and treating a large flow stream to recover a small portion of it as $CO_2$ is wasteful and expensive.

Another approach to $CO_2$ capture and sequestration involves mining, crushing and transporting rocks to the emission site, where the crushed rock is used to absorb $CO_2$. But this requires a good deal of heat and pressure. The energy input and environmental costs of mining the rock and transporting it to and from the $CO_2$ source, as well as the energy costs of having the crushed rock accept and absorb the $CO_2$, are very high.

Other ways to capture $CO_2$ include chemical absorption using liquids such as amines or aqueous solutions of bases, physical absorption in an appropriate solution and membrane separation. All of these methods have the problem that the absorption media need to be regenerated without losing $CO_2$. Other capture methods such as physical adsorption and cryogenic separation require significant amounts of energy in the form of heat or pressure.

Some $CO_2$ capture methods react $CO_2$ (or carbonic acid formed from water and $CO_2$) with an aqueous solution of an alkali to form a carbonate. However, a significant drawback of that approach is that the carbonate exits the process in solution with water, requiring further, energy intensive treatment to separate the solids and the water, or it results in a large volume, heavy, wet, cement-like paste that requires energy intensive drying and mechanical systems to control the size, configuration and weight of the resulting dried product.

Although some are examining techniques for capturing and sequestering $CO_2$ from ambient air, they are not suitable for $CO_2$ emissions from power plants because of the substantial difference in $CO_2$ concentration between ambient air and flue gas. Ambient air generally contains between about 0.03% and 0.04% $CO_2$, whereas flue gas contains 3.0% or higher concentrations of $CO_2$. Removing very small quantities of $CO_2$ from the very large quantities of ambient air is not as viable and as productive as the capture and sequestration of large amounts of $CO_2$ from streams, such as flue gas, where the $CO_2$ is more concentrated.

Therefore, there exists a need for a commercially viable carbon capture and sequestration process that works at industrial scales and is complete and permanent. Specifically, there is a need for a carbon capture system that does not use capture media that require complex and energy-intensive regeneration, and does not yield a heavy, wet end product that requires energy intensive drying and other post-capture processing. There is a further need for a carbon capture and sequestration process that permanently sequesters $CO_2$ at the site of $CO_2$ emission. In summary, a need exists for a carbon capture and sequestration system that is cost effective and not energy intensive and results in permanent sequestration of $CO_2$.

SUMMARY OF THE INVENTION

The present invention, in its many embodiments, alleviates to a great extent the disadvantages of known carbon capture and sequestration methods by providing a chemical process by which carbon dioxide in the form of carbonic acid is reacted with an alkali to form water and a dry, easily-removable carbonate that precipitates out of solution. Carbon dioxide sequestration is achieved by the above-ground disposal of the resulting carbonate. This process allows for industrial scale $CO_2$ capture and sequestration at relatively low costs. Embodiments of the present invention also provide permanent, on-site $CO_2$ capture and sequestration requiring relatively low energy consumption.

In an embodiment of the present invention, known as Vandor's Carbon Capture and Sequestration Cycle (VCCS), a method of capturing or sequestering carbon dioxide is provided in which a substantially non-aqueous solvent is mixed with an alkali such that the solvent and alkali form a solvent suspension. This mixing step may be performed in any suitable mixing vessel. The substantially non-aqueous solvent preferably is an alcohol, and is methanol in a most preferred embodiment. As such, the alkali reacts with the methanol to form methoxide, which may also include solvated metal hydroxide. Water and a flue gas containing carbon dioxide are mixed with the solvent suspension such that a reaction occurs, the reaction resulting in the formation of a carbonate, water and heat. The terms "solvent" and "non-aqueous solvent" will be used interchangeably herein to mean any substantially non-aqueous solvent that will tolerate some significant amount of alkali to be dissolved in it, and will force the precipitation of any salt that is produced in the classic acid+base reaction. The non-aqueous solvent contains less than 50% water, and most preferably less than 10% water.

The gas is preferably flue gas from a power plant, but may be any type of exhaust gas containing $CO_2$ from any industrial process. The gas will contain nitrogen ($N_2$) as well. The term "flue gas" will be used herein to mean any exhaust gas stream that contains carbon dioxide and either nitrogen or air, the exhaust gas being from a power generation plant's flue, including coal-fired, natural-gas-fired, oil-fired, and landfill gas (LFG)-fired or anaerobic digester (ADG)-fired power plants or from any industrial process including, but not limited to, cement making in kilns, glass, steel, rubber, paper, or other materials manufacturing, the production of ethanol, and from any combination of flue gas and process gas.

In one embodiment, ash is introduced into the solvent, and the alkali is a constituent of the ash. As used herein, the term "ash" will be used to mean fly ash, bottom ash and all types of alkali-containing ash from any source including from coal burning, wood burning and other bio-mass burning.

The chemical process of carbon capture and sequestration comprises mixing the water and the flue gas containing carbon dioxide with the alkali suspended in the solvent, preferably methoxide, so reactions occur that result substantially in the formation of a solid carbonate, water and heat. Small amounts of carbonic acid also are formed in the reactions, and the carbonic acid quickly reacts with the alkali. These reactions may be performed in any suitable reaction vessel. In a preferred embodiment, the carbonate precipitates out of solution and is removed from the vessel. Removal of the precipitated carbonate is preferably performed mechanically, using an auger or another suitable mechanical device that allows for the removal of solids without any liquids leaving the vessel at the same location. Any methanol that remains with the carbonate evaporates upon the addition of modest amounts of low-grade heat.

The water resulting from the reactions in the reaction vessel forms a solution with the solvent, and the method further comprises removing the solution of water and solvent and separating the water from the solvent. After the water and solvent are separated, the separated solvent is re-mixed with the alkali such that the solvent and alkali again form a solvent suspension that can be used for further carbon capture. The separated water is returned to the solvent suspension in the reaction vessel where it joins the flue gas and the methoxide to continue the reaction. In a preferred embodiment, the water is separated from the solvent by chilling the solution of water and solvent in a cryogenic drying vessel. When the solution is chilled, the water falls substantially to the bottom of the cryogenic drying vessel, and the solvent rises substantially to the top of the cryogenic drying vessel. In some embodiments, some carbonate will travel with the solution of water and solvent and precipitate out of the solution in the cryogenic drying vessel. A filter may be used to trap larger solids in the reaction vessel, keeping those larger solids from traveling on to the cryogenic drying vessel.

The remaining water may be separated from the solvent using a hot distillation vessel by applying heat to the solution of water and solvent to at least partially vaporize the solvent. A partial vacuum may be used to draw off vaporous solvent from the distillation apparatus, and the vaporous solvent is condensed to a liquid by cooling to be made suitable for re-use in the carbon capture and sequestration reactions.

Embodiments of the present invention include methods of using nitrogen from the flue gas to provide cooling for the carbon capture and sequestration process. The method may include liquefying the nitrogen and recovering refrigeration from the liquefied nitrogen. The recovered refrigeration from the nitrogen is then used to cool the solvent and provide cooling for the solvent regeneration steps. This use of nitrogen for cooling increases the energy efficiency of embodiments of the invention.

In a preferred embodiment, the flue gas further contains nitrogen and the nitrogen is used in three ways. A first portion of the nitrogen is used for refrigeration during the solvent regeneration process, a second portion is used to enhance the power output of a power plant, and a third portion is sold to off-site customers. All of the nitrogen is first compressed. For the portion used for refrigeration, a refrigerant source provides refrigerant to a heat exchanger, and the nitrogen is chilled in the heat exchanger such that it is substantially liquefied. Refrigeration may be recovered from the substantially liquefied nitrogen after it is pumped to pressure and sent to the power cycle to enhance the power output of the power plant that is the source of the flue gas. The recovered refrigeration is used to provide cooling for the cryogenic solvent removal process, discussed below, that separates the water from the solvent.

A second portion of the nitrogen may be used to enhance the power output of a power plant. In a preferred embodiment, a first portion of this substantially liquefied nitrogen is compressed and heated. The heated compressed nitrogen is directed to a steam cycle of a power plant to enhance the power output of the power plant. A second portion of this substantially liquefied nitrogen may be stored in a storage apparatus. The second portion of the substantially liquefied nitrogen is pressurized by pumping it to pressure. It is then vaporized and directed through a hot gas expander to enhance the power output of the power plant. A third portion of this liquefied nitrogen is sold to off-site customers for a variety of uses, including as a refrigerant and as a fluid to enhance oil and gas well recovery. In a preferred embodiment the liquefied nitrogen is further refined by removing liquid argon, which is approximately 0.9% of the volume of the recovered nitrogen stream, and which is a high-value product that may also be sold in the marketplace.

Embodiments of the present invention include carbon capture and sequestration systems which comprise a carbon capture assembly and a solvent regeneration assembly. The carbon capture assembly comprises a mixing vessel and at least one reaction vessel, and may further include a solvent condenser fluidly connected to the reaction vessel. In the mixing vessel, an alkali is mixed with a substantially non-aqueous solvent to form a suspension. In one embodiment, ash is introduced into the solvent, and the alkali is a constituent of the ash. The non-aqueous solvent preferably is an alcohol, and is methanol in a most preferred embodiment. As such, the alkali reacts with the methanol in the reaction vessel to form methoxide and possibly some metal hydroxide. Minor quantities of dimethyl-carbonate (DMC) may also form, but will quickly decompose due the alkaline conditions.

The reaction vessel is fluidly connected to the mixing vessel so it receives the suspension of alkali and a substantially non-aqueous solvent from the mixing vessel through a first input. The reaction vessel also receives flue gas containing heat and carbon dioxide through a second input and water through a third input such that carbonic acid, carbonate, water and heat are formed in the reaction vessel. More specifically, the carbon dioxide and water and any small amounts of carbonic acid that result from the reactions in the reaction vessel react with the alkali in the vessel, resulting in the formation of a carbonate, water and heat. The flue gas will contain nitrogen as well. In some embodiments, the carbon capture assembly further comprises a solvent condenser fluidly connected to the reaction vessel, where refrigeration is used to condense the solvent portion of the exiting stream, which consists of mostly nitrogen.

The solvent regeneration assembly is fluidly connected to the reaction vessel and comprises at least one heat exchanger, a cryogenic drying vessel fluidly connected to the heat exchanger, and a hot distillation vessel fluidly connected to the cryogenic drying vessel. The solvent regeneration assembly preferably has a plurality of heat exchangers to perform several intermediate heat recovery steps to warm the mostly water stream that arrives at the hot distillation vessel and to cool the methanol vapor that leaves the hot distillation vessel.

The carbonate formed in the reaction precipitates out of solution and is removed from the reaction vessel. The carbon capture assembly may further comprise an auger or other suitable device to remove the precipitated carbonate from the reaction vessel. The water resulting from the reactions forms a solution with the solvent in the reaction vessel, and this solution of water and solvent is removed from the reaction vessel and directed to the solvent regeneration assembly. The water is separated from the solvent by the solvent regeneration assembly, and the separated solvent is returned to the mixing vessel where it is re-mixed with the alkali to form a solvent suspension. Also, the separated water is returned to the reaction vessel to continue the reactions.

In some embodiments, a small portion of the carbonate (e.g., less than 10% by volume) will stay in the solvent and travel with the solvent suspension through the solvent regeneration assembly. When the selected alkali is CaO, the solution of water and solvent is free of any carbonates. When the selected alkali is KH, some carbonate will form a solution with the water+solvent. That small portion of carbonate will fall out of the solvent suspension with the water that is separated from it. First, the separation process uses the cryogenic drying vessel in which the solution of water and solvent is chilled so the water falls substantially to the bottom of the cryogenic drying vessel, and the solvent rises substantially to the top of the cryogenic drying vessel. Part (or in a more energy-intensive option, all) of this separation process uses the hot distillation vessel, where heat is applied to the solution of water and solvent, a partial vacuum draws off vaporous solvent from the hot distillation vessel, and the vaporous solvent is condensed.

Some embodiments may include a nitrogen liquefaction assembly which substantially liquefies nitrogen contained in the flue gas and recovers refrigeration from the substantially liquefied nitrogen. The recovered refrigeration from the nitrogen may be used to cool the solvent and to provide cooling for the solvent regeneration assembly. That portion of the liquid nitrogen is sent to the regeneration assembly under pressure, having been pumped to pressure by a cryogenic pump. The solvent regeneration assembly heats a first portion of the substantially liquefied nitrogen and directs the heated nitrogen to a steam cycle of a power plant to enhance the power output of the power plant. A storage apparatus stores a second portion of the substantially liquefied nitrogen, releases the second portion of the substantially liquefied nitrogen, and directs it to a hot gas expander to enhance the power output of a power plant.

Embodiments of the present invention include methods for separating chemical constituents of flue gas (containing $CO_2$, a relatively large portion of $N_2$, and a much smaller portion of argon) comprising mixing a substantially non-aqueous solvent and an alkali such that the solvent and alkali form a solvent suspension. Water and a flue gas containing carbon dioxide and nitrogen are introduced to the solvent suspension. The alkali in the solvent suspension is contacted with the water and the carbon dioxide in the flue gas such that a series of fast-paced chemical reactions occur. The reactions result in the formation of a carbonate, water and heat, with the unreacted mostly-nitrogen portion leaving the reaction vessel as a gas, and carrying with it small quantities of vaporized solvent.

That mostly-nitrogen stream is chilled in a solvent condenser so as to liquefy that small solvent portion, which is returned to the methanol+alkali mixing vessel. The remaining mostly-nitrogen gas stream is liquefied by compressing and chilling the nitrogen. In a preferred embodiment, the refrigeration content of the substantially liquefied nitrogen is recovered and used to provide cooling for separating the water from the solvent. The nitrogen portion used for cooling is first compressed by pumping it to pressure using a cryogenic liquid pump and then heated by recovered heat in the solvent regeneration assembly. That nitrogen is then directed to a steam cycle of a power plant, or to a generator-loaded hot gas expander to enhance the power output of the power plant. A second portion of the substantially liquefied nitrogen is stored and then may be vaporized and directed through a hot gas expander to enhance the power output of a power plant. A third portion of the substantially liquefied nitrogen is sold to off-site customers.

Accordingly, it is seen that a chemical process for securely and cost effectively capturing and sequestering carbon dioxide on site at a large scale is provided in which carbon dioxide in the form of carbonic acid reacts with an alkali in a solution to form a carbonate, water and heat. These and other features of the present invention will be appreciated from review of the following detailed description of the invention, along with the accompanying figures in which like reference numbers refer to like parts throughout.

BRIEF DESCRIPTION OF THE DRAWINGS

The foregoing and other objects of the invention will be apparent upon consideration of the following detailed description, taken in conjunction with the accompanying drawings, in which.

DETAILED DESCRIPTION

In the following paragraphs, embodiments of the present invention will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations on the present invention. As used herein, the "present invention" refers to any one of the embodiments of the invention described herein, and any equivalents. Furthermore, reference to various aspects of the invention throughout this document does not mean that all claimed embodiments or methods must include the referenced aspects. Reference to temperature, pressure, density and other parameters should be considered as representative and illustrative of the capabilities of embodiments of the invention, and embodiments can operate with a wide variety of such parameters. It should be noted that the figures do not show every piece of equipment, nor the pressures, temperatures and flow rates of the various streams.

The examples of gas, liquid, and solid products produced by various embodiments of the present invention are not intended to be comprehensive. Some minor products of embodiments of the invention, including those that form temporarily and then dissolve, will not be discussed in great detail below but are understood to be included within the scope of the invention. Not all points of heat generation will be mentioned below, but it is understood that all worthwhile heat produced in embodiments of the invention will have the potential for heat recovery and potential use, thus reducing the total energy input required by the process.

Figure 1:
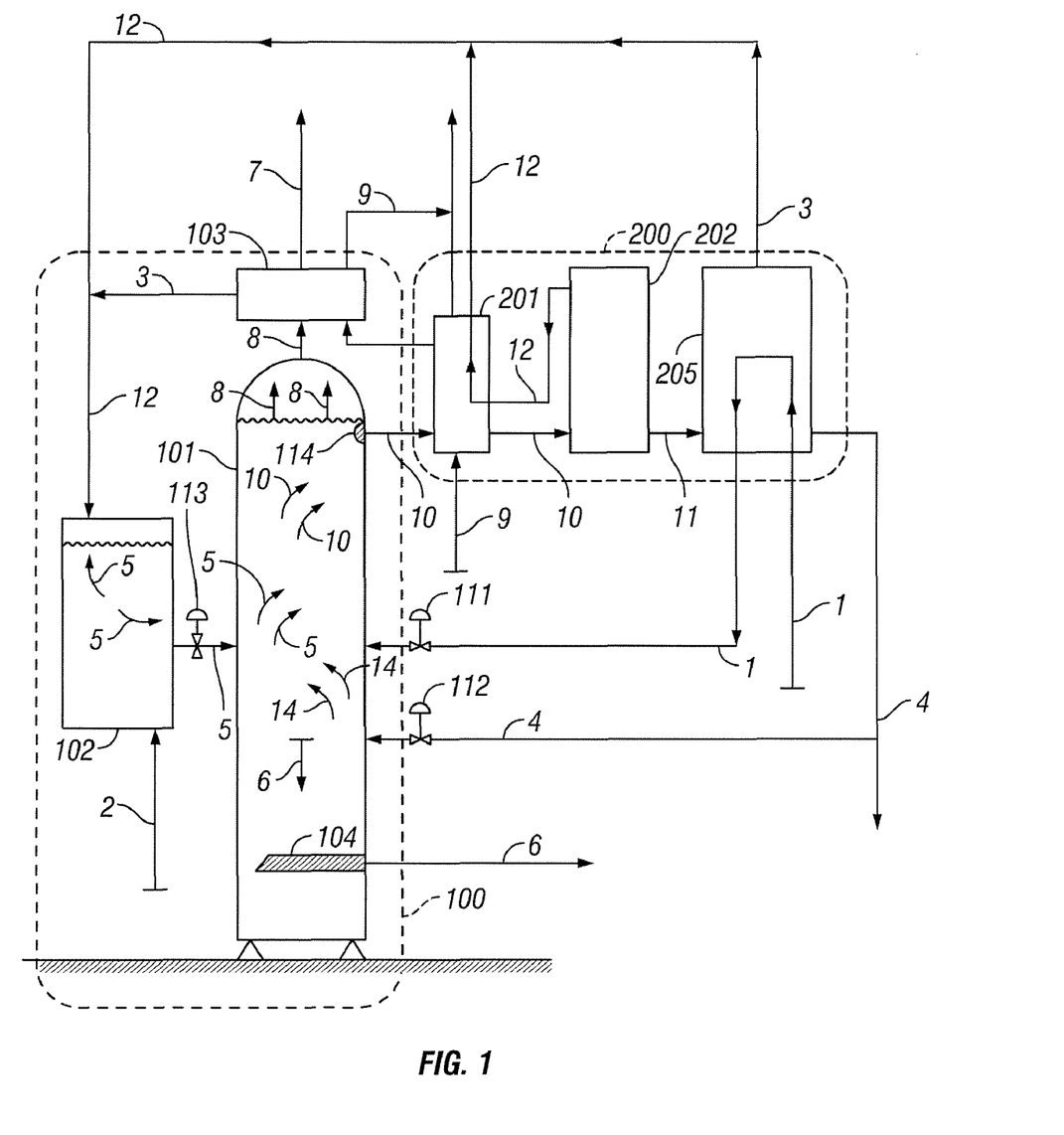
FIG. 1 is a process diagram of an embodiment of a carbon capture and sequestration system in accordance with the present invention.

FIG. 1 shows two major subsystems of an embodiment of the present invention, a carbon capture assembly 100, and a solvent regeneration assembly 200. Carbon capture assembly 100 includes reaction vessel 101 and mixing vessel 102 and preferably includes solvent condenser 103. The solvent regeneration assembly 200 will be described in detail herein in connection with FIG. 2. The system shown can be used with any power plant and with any type of exhaust gas, and is particularly well-suited for capturing and sequestering carbon dioxide from flue gas from a coal-fired power plant. Flue gas from engines, such as at LFG sites, produce exhaust gas at close to 900° F. While most such engine-drive systems do not have heat recovery attachments, the low-grade heat content of the flue gas is a significant energy source for embodiments of the present systems and methods.

The chemical process of carbon capture and sequestration comprises contacting the $CO_2$+water and some temporarily formed (small quantities) of carbonic acid 14 with the alkali 2 that is suspended in methoxide 5 so there is a reaction that results in the formation of precipitating carbonate 6, water-methanol solution 10 and heat. To begin with, $CO_2$-laden flue gas 1 and water 4 are introduced into the methoxide 5, both streams entering reaction vessel 101 separately at the same time. That separation allows full control over the flow rate of both streams and allows the water stream 4 to be adjusted in response to any minor amounts of water vapor contained in the flue gas. Reaction vessel 101 receives the methoxide suspension 5, which consists of alkali 2 and a substantially non-aqueous solvent 12, from the mixing vessel 102 through a first input 113, which is preferably an input valve. Reaction vessel 101 receives flue gas 1 through a second input 111 and water through a third input 112, both preferably input valves. The reactions between the $CO_2$+water (and small amounts of temporary carbonic acid 14) and the alkali 2 contained in the methoxide 5 occur rapidly (sometimes in less than a second), fully converting the gaseous $CO_2$ into solid carbonates and byproducts of water and heat.

In a preferred embodiment, the carbonate 6 precipitates out of solution and is removed from reaction vessel 101 mechanically, using an auger 104 or any other device or system suitable for mechanically removing carbonate precipitates. In some embodiments, up to approximately 10% of the volume of the water-methanol solution 10 remaining in reaction vessel 101 will contain suspended carbonate, which will not fall to the bottom of the reaction vessel but will fall out of solution during the methanol regeneration process. The water resulting from the acid+base reactions forms a solution with the solvent. That water-solvent solution 10 is removed through a filter 114, which prevents larger solids from leaving the reaction vessel, and which will fall to the bottom of the vessel, where they will be mechanically removed. The method further comprises removing water-solvent solution 10 from reaction vessel 101 and separating the water from the solvent. In those embodiments that carry carbonates in the water-solvent solution 10, the carbonates will separate out with the water. This solution 10 of water and methanol is withdrawn near the top of reaction vessel 101 at a warm temperature that reflects the optimum temperature of the reactions, which will minimize the time required for the reactions.

As a preliminary step, an alkali 2 is mixed with a solvent 12 in mixing vessel 102, to form a suspension 5. Any of a number of alkalis known in the art can be selected for neutralizing the $CO_2$ in flue gas, producing their respective carbonates. The alkali may be a strong or a weak base, and may include such common bases as sodium hydroxide (NaOH) or potassium hydroxide (KOH) in powdered form, or hydrides such as magnesium-, potassium- or sodium hydride (MgH, KH, NaH), or anhydrous ammonia, or calcium oxide (CaO) found in the fly ash (and bottom ash) that is another byproduct of coal-fired or biomass power plants and boilers, or any other suitable alkali, natural or synthetic that will react with the $CO_2$.

One advantage of embodiments of the present invention is that it can be used to perform carbon capture and sequestration at large industrial scales. Employing the systems and methods described herein at facilities of all sizes allows use of multiple alkalis, resulting in their respective carbonates. An illustrative list, followed by the chemical symbol of each alkali and the carbonate produced when reacted with $CO_2$ and the chemical symbol of each carbonate, is provided here:

Ammonia (anhydrous), $NH_3$→Ammonium carbonate, $(NH_4)_2CO_3$

Lithium Hydride, LiH→Lithium carbonate, $Li_2CO_3$

Lithium Hydroxide, LiOH→Lithium Carbonate, $Li_2CO_3$

Magnesium Hydride, $MgH_2$→Magnesium Carbonate, $MgCO_3$

Magnesium Hydroxide, $Mg(OH)_2$→Magnesium Carbonate, $MgCO_3$

Potassium Hydride, KH→Potassium Carbonate, $K_2CO_3$

Potassium Hydroxide, KOH→Potassium Carbonate, $K_2CO_3$

Sodium Hydride, NaH→Sodium Carbonate, $Na_2CO_3$

Sodium Hydroxide, NaOH→Sodium Carbonate, $Na_2CO_3$

One embodiment uses potassium hydride (KH), possibly in combination with other alkalis. $MgH_2$ and ash could be used in combination with the KH to increase the $CO_2$ capture rate. The hydrides of potassium, sodium, magnesium, (KH, NaH, and MgH, respectively) are less expensive than their hydroxide counterparts (KOH, NaOH, $Mg[OH]_2$), and yield a larger amount of carbonate per unit of hydride than the hydroxides, making the hydrides more economical. Such combinations of alkalis would require multiple mixing vessels and multiple reaction vessels. Some hydrogen may also form as a by-product of using certain hydrides. For example, about 930 L of hydrogen will result from NaH and about 560 L of hydrogen will result from KH for every two pounds of hydride dissolved in methanol. Such an $H_2$ stream would not be vented, but would be used as fuel in one of several possible locations in embodiments of the invention. For example, the $H_2$ stream can be sent directly to the combustion chamber of the power plant, or it can be burned in a supplemental heater that provides additional heat to the $N_2$ stream that is used for enhanced power output. The selection of alkalis and the resultant carbonates will depend on the markets for those carbonates and the relative costs of the alkalis when compared to the value of the carbonates.

A preferred embodiment uses the alkali present in fly ash, the fine powder recovered from flue gas at coal-fired and biomass power plants or coal-fired and biomass boilers, prior to the release of the flue gas to the atmosphere. Similarly, bottom ash, resulting from the remains of the coal or biomass that does not travel up the flue, is a product for which uses are sought, but which is still a significant waste stream. The following discussion on ash covers both fly ash and bottom ash, which have similar chemical components, and all other alkaline ash from any source.

Much of the ash produced at coal-fired power plants does not have a use. Most of it is transported to landfills for disposal, or for other low-value applications. Ash from lignite, a widely-used type coal, contains 15-45% $SiO_2$ (sand), 20-25% $AlO_3$ (aluminum oxide), 4-15% $Fe_2O_3$ (iron oxide) and 15-40% CaO (calcium oxide), with up to 5% unburned carbon. Sub-bituminous coal will produce fly ash with lesser proportions of CaO (5-30%), which can also be used as an alkali source, but requiring larger amounts of ash to produce the same results. The removal of the iron oxide by magnetic means, preferably when the ash is suspended in methanol, will serve to concentrate the amount of CaO in the methoxide, yielding another profitable byproduct (iron oxide) and reducing the weight and transport costs of the final carbonate-laden solid product stream by the removal of the relatively heavy iron. The CaO contained in fly ash is the same alkali that one can purchase as lime, but in this context is a byproduct of the burning of coal that contained calcium carbonate. Thus, the CaO is obtained from the ash with no additional $CO_2$ emissions beyond what the power plant normally emits. By contrast, buying manufactured CaO would increase the carbon footprint of this process because manufacturing CaO results in large $CO_2$ emissions.

One embodiment of the carbon capture and sequestration method hosts the ash and the $CO_2$-containing flue gas 1 in methanol 12, substantially limiting the amount of water in reaction vessel 101. This allows the reaction to yield a dryer and more controllable (as to size and configuration) end product. In this preferred embodiment, the end product will be uniformly sized granules, requiring little or no post-dryer crushing, yielding a suitable agricultural lime substitute, while minimizing the amount of input energy required by the process.

The glass-like ash may benefit from a rapid cooling process that cracks the microscopic ash particles, thus facilitating the reaction of the alkali in the ash with the $CO_2$ and water delivered to the reaction vessel by streams 1 and 4. That rapid cooling preferably includes first warming the ash and then rapidly cooling it in deeply chilled methanol, thus cracking each glass-like bead of microscopic ash. If the reactions occur in warm methanol (as is likely), then the quenching of the ash stream can occur first in one vessel, followed by the mixing of the methanol plus ash solution with warmed methanol in a separate reaction vessel. The heat needed to warm the ash before the rapid cooling may be delivered from one of the many heat recovery points in the process.

It is preferred that the acid+base reaction occur in a host liquid having the alkali, or base, in solution, and allow for easy contact between that base and the $CO_2$+water (plus small amounts of temporary carbonic acid) that is formed when $CO_2$ and water are introduced to alkaline-laden solvent. Therefore, preferred embodiments use a substantially non-aqueous solvent to host the reaction. This is accomplished by withdrawing from the top of reaction vessel 101 the water-methanol solution 10, at the same rate as the reaction produces water, and replacing the water-methanol solution 10 with an equivalent volume of rich (i.e., substantially water-free) methoxide 5. The amount of water inflow to the reaction vessel is dependent on the water content of the flue gas and the quantity of water that might remain in solution in the methanol from prior inflow of flue gas.

In addition, the water that is a product of the acid+base reaction needs to be withdrawn from reaction vessel 101 at a sufficient rate so as to prevent the methoxide 5 from hydrolyzing. The mostly dry flue gas 1 is bubbled through the methoxide 5, along with an appropriate amount of water (stream 4), allowing the $CO_2$ to react with the alkali and temporarily form small quantities of carbonic acid 14, which also reacts with alkali 2 that is held in solution 5 by the solvent 12. It is preferred that the flue gas 1 enter reaction vessel 101 at enough pressure, e.g., approximately 16.5 psia, so that the flue gas 1 can rise through the host methoxide 5 and allow the unreacted portion of the flue gas (mostly $N_2$) to leave reaction vessel 101, as a mostly $N_2$ and vaporized methanol stream 8, which is recovered by condensation in solvent condenser 103.

Accounting for pressure drop along the pre-cooling route of the flue gas, the present invention seeks to receive the flue gas at approximately 17 psia.

In a preferred embodiment, the non-aqueous solvent is an alcohol and most preferably, methanol. However, any other suitable non-aqueous solvent that will tolerate some significant amount of alkali to be dissolved in it, and will force the precipitation of any salt that is produced in the classic acid+base reaction may be used. Ethanol is a somewhat costlier alternative, which may be selected if, for example, the process is used to capture and sequester $CO_2$ produced at an ethanol plant. In that context, the ethanol will be available at the equivalent of a wholesale price, and make-up ethanol will not require any shipping. The purpose of the solvent is to allow the acid+base reactions to occur within a substantially dry liquid, thus avoiding the formation of salt water or carbonates suspended in water, and avoiding an end product with a high percentage of water that must be driven off.

The alkali 2 mixes with the methanol solvent 12 to form methoxide 5, a solution of methanol and any appropriate hydride or hydroxide base where the base is in suspension. The following is one example of a generic chemical equation for the mixing of an alkali (KH, or potassium hydride) with methanol: $2KH+MeOH$ yields $2MeOK+H_2$. The methoxide may be refrigerated to recover and counter-act the heat of reaction that will occur when some alkalis are introduced into methanol. The choice of how cold the methoxide should be will depend on which alkali is selected and which carbonate will be the end product of the reaction, and by the methods selected for controlling the temperature of reaction vessel 101, and thus limiting the boil off of methanol from the reaction vessel.

Figure 2:
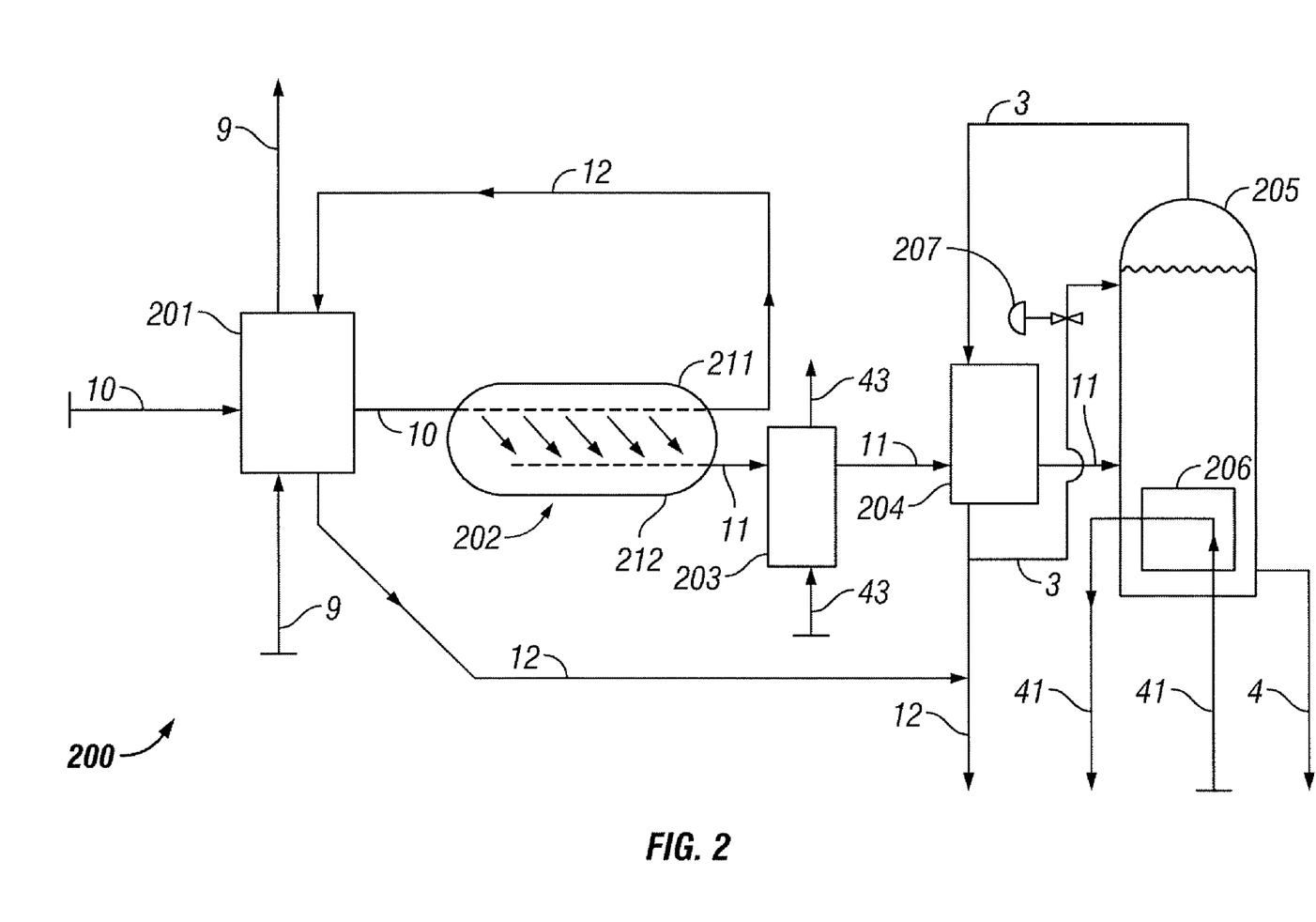
FIG. 2 is a process diagram of an embodiment of a solvent regeneration assembly in accordance with the present invention.

Mixing the alkali 2 with ambient temperature methanol 12 in mixing vessel 102 creates heat as the two compounds interact, and will produce an ionic solution of methoxide 5, which may include solvated metal hydroxide. The heat of reaction in the resultant solution, which typically is in the range of about 225° F. to about 300° F., may be recovered and used to warm other segments of the process. It should be noted that some dimethylcarbonate (DMC) will also form in mixing vessel 102, but will subsequently decompose. After heat recovery, the methoxide 5 is sent to reaction vessel 101 to host the incoming streams of water 4 and mostly dry flue gas 1, which is bubbled through the methoxide 5. The flow rate of the methoxide 5 into reaction vessel 101, as well as the outflow of water-methanol solution 10 from reaction vessel 101 to cryogenic drying vessel 202 (via first heat exchanger 201) and to the hot distillation column 205, will depend, first, on the flow rate of the flue gas 1 and the $CO_2$ content of the flue gas. Secondly, the flow rates will be strictly controlled so as to never allow more than approximately 10% water in the reaction vessel because a methoxide medium with a larger moisture content will not as readily precipitate the carbonate salt.

Methoxide 5 enters reaction vessel 101 into which the flue gas stream 1 and water 4 are introduced. Some embodiments may use multiple reaction vessels in series to allow for the constant flow of flue gas. A preferred reaction vessel has a height of approximately 40 feet and may be made of stainless steel or appropriately coated carbon steel, or any other material that can tolerate acids, bases, water and heat without corroding. Reaction vessel 101 is fluidly connected to mixing vessel 102 such that the alkali-solvent suspension, here methoxide, enters the reaction vessel through a first input. As discussed in more detail herein, flue gas stream 1 arrives in reaction vessel 101 through a second input having given up some its heat content in a hot distillation step associated with the regeneration of the methanol. The chemical process in the reaction vessel can be summarized by the following equation:

$$CO_2^{gas} \longleftrightarrow CO_2^{sol} + HO^- \longleftrightarrow HCO_3^- \longleftrightarrow H_2CO_3 \text{ or } CO_3^{2-} \quad (1)$$

The first step in (1) above is the physical dissolution of carbon dioxide gas in the substantially non-aqueous solvent. This dissolution is reversible, as indicated by the double-headed arrows. The second step in (1) is the capture of $CO_2$ by the water or the base to form small amounts of carbonate in the free form (carbonic acid, $H_2CO_3$) and carbonate ions. Ion formation depends on the alkalinity of the solution. The reactions are fast, virtually instantaneous. The carbonate ions are removed from the vessel as metallic salts (e.g., calcium carbonate or potassium carbonate) that precipitate to the bottom, thus allowing the reaction to continue. The alkalinity of the solution and the solubility of the metallic carbonates in the solvent determine the rate of carbonate formation and precipitation. Therefore the actual operation of the reaction will be optimized by controlling the alkalinity of the solvent and the temperature, pressure and flow rates of the various streams, relative to the solubility of the selected carbonate product.

Preferably, the water produced from the acid-base reaction should not exceed approximately 10% of the volume of the methanol in the reaction vessel. Water control is achieved by constantly drawing off water-solvent solution 10 from the reaction vessel and replacing it with pure, regenerated methanol. This solvent regeneration process is discussed in detail below.

The reaction of alkali 2 and carbonic acid 14 produces a carbonate 6 that precipitates to the bottom of reaction vessel 101, where it is removed by auger 104 or any other device or system that can mechanically remove precipitated carbonate. If KH is used as the alkali, some portion of the carbonate 6 will likely stay in solution in the methanol, and will leave with the water-methanol solution 10 and fall out later during cryogenic drying. The removed material may undergo drying by recovered heat from elsewhere in the process, yielding a fine powder or pellets. The carbonate 6 that falls to the bottom of reaction vessel 101 may carry with it a small amount of methanol, but preferably will not carry water. The reaction will cause the water-methanol solution product 10 to rise upward in reaction vessel 101, while the precipitating carbonate 6 will fall toward the bottom.

Thus, the design of the reaction vessel takes advantage of the rising liquid and flue gas streams and the falling carbonate. For example, the methoxide 5 and cool flue gas 1 enter near the bottom of reaction vessel 101, while the warmer water-methanol solution 10 is withdrawn near the top, with the inert gases ($N_2$, and in some instances $O_2$) moving on to further processing steps in nitrogen liquefaction assembly 300, shown in FIG. 3 and in more detail in FIG. 4. Any methanol (in the form of water-methanol solution 10) that leaves reaction vessel 101 with the carbonate is allowed to evaporate. The dry carbonate would be sent to end-users for use as fertilizer, a lime substitute, in mine reclamation, road fill, or other industrial uses. A substantial percentage of the acidic oxides of nitrogen contained in the flue gas stream will also react with the alkali in the methoxide, yielding various salts containing nitrogen, including but not limited to nitrides, thus reducing the emissions from the power plant.

The carbonate 6 produced from the reaction of carbonic acid 14 and alkali 2 depends on the selected alkali. One possibility is calcium carbonate, which can be used as a substitute for lime in agricultural fertilizer, or in steel making, oil drilling, diapers, and glass making. Another potential product is magnesium carbonate, which may be used as a fertilizer as a substitute for dolomitic limestone, allowing for the avoidance of liming, resulting in the avoidance of $CO_2$ emissions by reducing the $CO_2$ emitted during lime production. Potassium carbonate is another possible product that can be used as a fertilizer and also avoids liming. Other potential end products of embodiments of the invention may include silicon nitride ($Si_3N_4$), calcium nitride ($Ca_3N_2$), or magnesium nitride ($Mg_3N_2$), when metals are burned in pure nitrogen. The separation of argon (as liquid argon) from the liquid nitrogen product stream is especially appealing because the nearly 1% argon content of the flue gas will yield a high-value liquid argon stream if a cold distillation column is included in the $LN_2$ production loop.

With the $CO_2$ removed from the flue gas 1 and chemically converted to a carbonate 6, the remaining portion of the flue gas is mostly nitrogen. Stream 8, which contains nitrogen and some methanol, leaves the top of reaction vessel 101. The hotter the reaction, the more vaporized methanol will leave with the $N_2$ gas. Reaction temperatures of more than 150° F. will cause too much methanol to leave the vessel with the $N_2$. Thus, the heat of reaction needs to be controlled. For example the inlet methoxide stream 5 to reaction vessel 101 may be pre-cooled. Alternatively, reaction vessel 101 may be cooled internally by a heat exchanger suspended near the top of the vessel, for example, using a cold $N_2$ stream 9, to cool the liquid in the reaction vessel to maintain its methanol content in a condensed (liquid) state, allowing the remaining $N_2$ vapor to move on to nitrogen liquefaction assembly 300 for liquefaction. Preferably, the reaction is allowed to reach near 150° F., tolerating some methanol boil off, but recovering that methanol immediately after it leaves reaction vessel 101 in solvent condenser 103.

The methods of controlling the temperature in the reaction vessel can include cooling the inlet streams (methoxide, water, etc.) and/or cooling the liquids in the reaction vessel by an internal heat exchanger, and/or a combination of those techniques. Those options are not illustrated in FIG. 1. Those familiar with the engineering of such heat control systems would select an optimal method. The extent to which the reaction vessel needs to be cooler than 150° F. will be determined by thermodynamic calculations that optimize the rate of the reaction but without causing excessive methanol boil off from the reaction vessel.

The stream that leaves solvent condenser 103 is flue gas with mostly $N_2$ 7, but it may also include argon, and low amounts of $O_2$, depending on the source of the flue gas. Trace amounts of water or $CO_2$ (parts per million) would be removed in a molecular sieve 305 (shown in FIG. 4) prior to the liquefaction of the $N_2$ stream 7 as discussed below. Much of the $N_2$ can be cost-effectively compressed and chilled, and thus liquefied by processes known in the art, to yield liquid nitrogen ($LN_2$) of a relatively high purity, but at much lower costs than can be produced at standard air separation plants.

Figure 3:
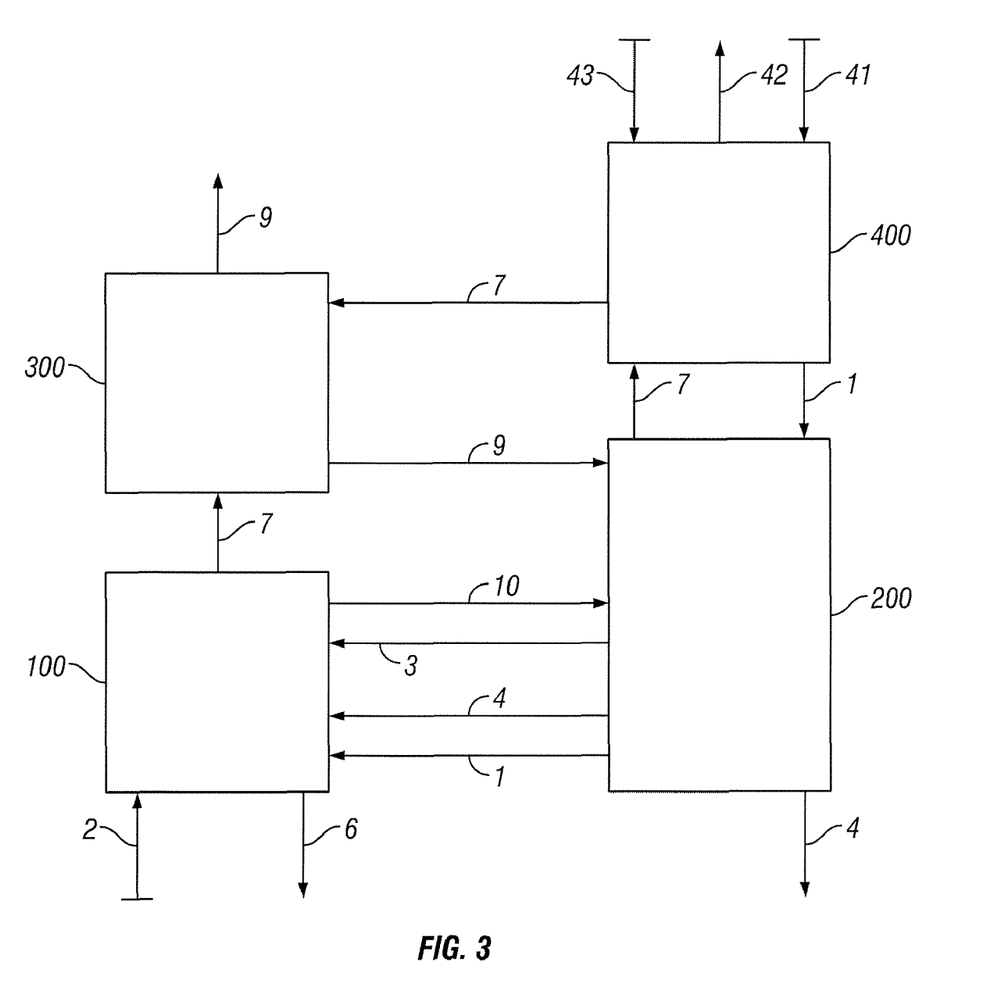
FIG. 3 is a process diagram of an embodiment of a carbon capture and sequestration system in accordance with the present invention integrated with a power plant.
Figure 4:
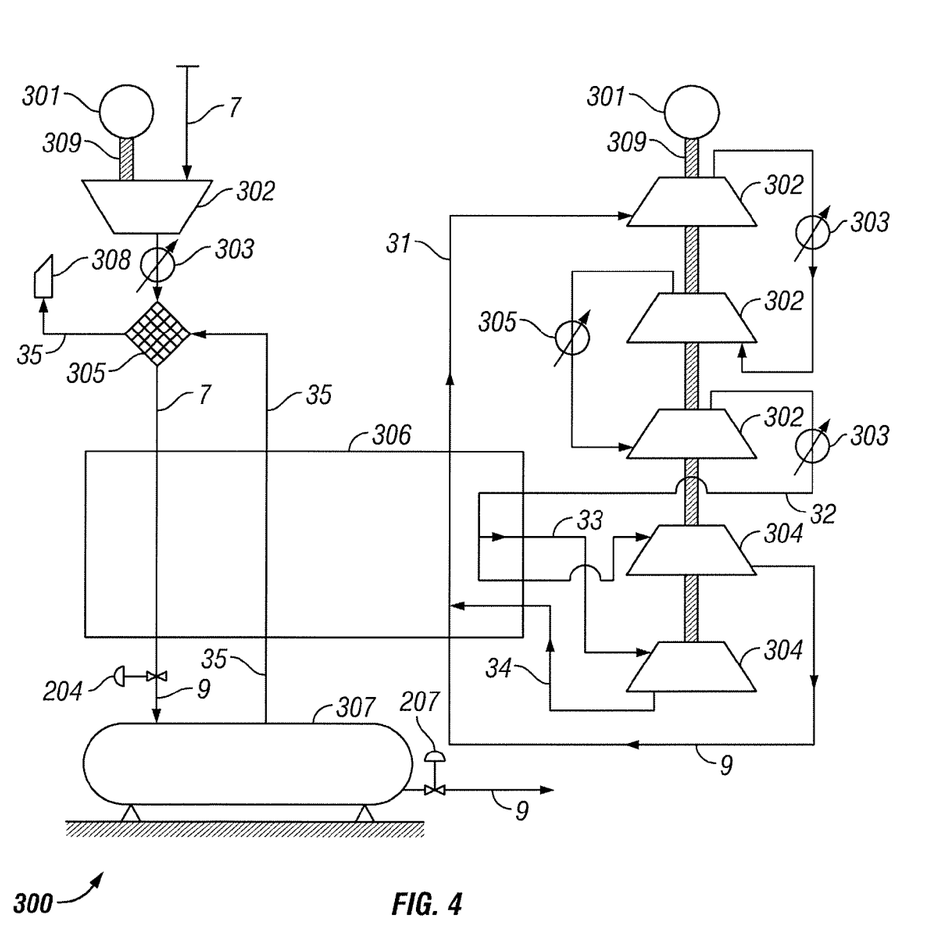
FIG. 4 is a process diagram of an embodiment of a nitrogen liquefaction assembly in accordance with the present invention.

This process is performed by nitrogen liquefaction assembly 300, shown in FIG. 3 and FIG. 4.

Turning to FIG. 2, solvent regeneration assembly 200 is shown in more detail. Solvent regeneration assembly 200 is fluidly connected to reaction vessel 101 and comprises first heat exchanger 201, cryogenic drying vessel 202 fluidly connected to the first heat exchanger, and hot distillation vessel 205 fluidly connected to the first heat exchanger. Additional heat exchangers may be used and will be described herein. Water-methanol solution 10 is sent to first heat exchanger 201, where it is deeply chilled by heat exchange with liquid $N_2$ 9 that has been pumped (by a cryogenic pump, not shown) to a high pressure, e.g., approximately 800 psia, or any other pressure suitable for the power enhancement features discussed below. The deeply chilled water-methanol solution 10 is then sent to cryogenic drying vessel 202, where the now nearly frozen water it contains (a "slush" of water with small amounts of methanol) falls to the bottom of the cryogenic drying vessel 202, allowing that mostly water stream 11 to be drawn off from the bottom 212 of cryogenic drying vessel 202, and leaving a mostly methanol stream to be drawn off from the top 211 of the vessel. If KH is being used as the alkali, some of the carbonate will fall out in the cryogenic drying vessel 202.

In some embodiments, water-methanol stream 10 will carry carbonates in solution with the methanol. Those solids will precipitate toward the bottom 212 of the cryogenic drying vessel 202 and would be removed by mechanical means from the bottom of the vessel, with water-methanol stream 11 removed as mostly water from a higher point on vessel 212. Neither streams 11 nor 12 will carry any solids with them as they move on in the cycle.

Next, the mostly water stream 11 travels on to the second heat exchanger 203, which is preferably an ambient air heat exchanger, for warming. Other sources of heat may include various heat-carrying streams, such as stream 7, in FIG. 1, after that stream leaves solvent condenser 103. That choice would serve to pre-cool the $N_2$ stream before it arrives at nitrogen liquefaction assembly 300 for liquefaction. From second heat exchanger 203, the mostly water stream 11 enters third heat exchanger 204, where it is further warmed by methanol vapor 3 that is driven off from the hot distillation vessel 205. For the sake of clarity, third heat exchanger 204 is shown directly between second heat exchanger 203 and distillation column 205. A fully engineered version of the process will likely place third heat exchanger 204 above distillation column 205, allowing the reflux solvent stream that travels through control valve 207 to fall into the column by gravity. Alternatively, a small pump would move the reflux stream from 204 to 205.

The methanol vapor 3 used in third heat exchanger 204 preferably is approximately 150° F. and higher, substantially pure methanol vapor. Water may be recovered from hot distillation vessel 205 and used to warm the $N_2$ stream as it leaves first heat exchanger 201, on its way to its power enhancement function in power plant 400, the power cycle which produces the flue gas in the first place, and which powers the nitrogen liquefaction assembly 300. Methanol stream 3, which is a vapor at this point, is condensed to a liquid by the mostly water stream 11, allowing recovered methanol 12 to be sent back to mixing vessel 102 for further methoxide production. The resulting methoxide suspension may contain some water.

That stream 12, (with very little water content) is removed from the top of cryogenic drying vessel 202, as a dry methanol and returned through first heat exchanger 201 (recovering its coldness) and then joining the return stream that exits third heat exchanger 204, with the combined mostly-methanol stream 12 sent back to mixing vessel 102. The return flow of stream 12 (mostly dry methanol) travels through first heat exchanger 201, helping the liquid $N_2$ to cool the water-methanol stream 10 from the reaction vessel 101.

The mostly water stream 11 that leaves cryogenic drying vessel 202 and is warmed in second heat exchanger 203 and third heat exchanger 204, is heated in hot distillation vessel 205, driving off its limited content of methanol vapor and allowing pure water to leave the bottom of the hot distillation vessel 205. The heat source for this distillation is the hot flue gas 41 which travels through re-boiler 206 at the bottom of hot distillation vessel 205. The hot flue gas gives up much of its heat in this step, but still has enough remaining heat that can be recovered for use elsewhere. Most of the recovered water 4 that leaves hot distillation vessel 205 is sent back to reaction vessel 101 so that the $CO_2$ in the flue gas can form carbonic acid 14, as illustrated in FIG. 1. Any extra water that may be produced can be sent through one or more layers of activated charcoal filtration, after it leaves hot distillation vessel 205, allowing that water to be potable. Alternatively, excess recovered water may be sent to the steam cycle of the power plant as a source of make-up water, replacing water lost in the steam cycle. Flue gas from natural gas fired power plants will have a higher water content, requiring less of the water 4 recovered from hot distillation vessel 205 to be returned to reaction vessel 101 to form carbonic acid with the $CO_2$ in the flue gas.

Low-pressure methanol vapor 3 leaves the top of hot distillation vessel 205 (also known as a distillation column). The heat of that vapor is used to pre-warm the cold (mostly water) stream 11 that is sent to the hot distillation vessel 205. That heat exchange causes the methanol vapor 3 to condense. A portion of the condensed methanol stream is sent back to the top of the hot distillation vessel 205 as a type of reflux stream, which helps vaporize the methanol in the mostly water mixture below it. Preferably, the portion of the condensed methanol stream sent back to the top of hot distillation vessel 205 is approximately 10% of the stream. Valve 207 is shown on the reflux line, prior to the stream's entry into the vessel.

The liquid $N_2$ stream 9 travels through first heat exchanger 201, deeply chilling (to between about −50 and −80° F.) water-methanol stream 10. The flow rate of the liquid $N_2$ 9, through first heat exchanger 201, controls the exit temperature of the vaporized liquid $N_2$ (now $N_2$). In a preferred embodiment, the vaporized $N_2$ is cold enough to serve as the refrigerant in solvent condenser 103 that condenses the methanol contained in the mostly-$N_2$ stream that leaves reaction vessel 101 (as seen on FIG. 1). That side-loop of $N_2$, having helped condense the methanol in the outflow stream 8 from reaction vessel 101, rejoins the high-pressure $N_2$ stream that leaves first heat exchanger 201, and is sent on to do power enhancement work in the basic power production cycle. Solvent condenser 103 recovers the heat content of the $N_2$+methanol stream 8 that leaves the warm reaction vessel 101, and transfers that heat to the cool $N_2$ side-stream 9 that leaves first heat exchanger 201, and which rejoins the main $N_2$ stream 7, on its way to the power cycle. This allows the acid+base reaction in the vessel to occur at the hottest conditions, yielding valuable low-grade heat that is transferred to the $N_2$ stream 7, shown rejoining the main $N_2$ stream that left heat exchanger 201. The warming of that $N_2$ stream that is traveling from 201 toward subsystem 400 is achieved by the cooling of $N_2$ stream 7 that leaves solvent condenser 103, on its way to liquefaction in subsystem 300.

It should be noted that the distillation of the water-methanol solution 10 that is drawn off from reaction vessel 101 can occur in several ways, including by heat (such as from the heat content of the flue gas), by heat augmented by a partial vacuum to draw off the methanol vapor from the hot distillation vessel 205, or by vapor recompression methods. However, all those methods would require more heat than is available in the flue gas. Instead, the present invention "pre-distills" the wet methanol stream and deeply chills the water-methanol solution 10 such that the denser water travels to the bottom of a container and allows that saturated methanol stream to be further distilled by any one or a combination of the above methods.

A preferred embodiment shown in FIG. 2 relies on off-peak power stored in the form of liquid $N_2$ to achieve the distillation (regeneration) of the water-methanol solution 10. The cold distillation step yields a mostly-water stream, out of which the remaining methanol is distilled by heat. The preferred two-step (cold and hot) regeneration process requires much less heat to distill the water-methanol solution 10 if the ratio of water is very high relative to the ratio of methanol, as is the case for the arriving mostly water stream 11 that is sent to hot distillation vessel 205. The net energy required to regenerate the methanol will be less when refrigeration is included in embodiments of the invention, because the wider temperature range (between the hot and cold sides of the distillation) allow for a good deal of heat and cold recovery. Additionally, the production of liquid $N_2$ will yield a good deal of low-cost refrigeration. It should be noted that FIG. 2 does not show every possible heat recovery step that may optimize the efficiency of the process and shows only one control valve. Other valves, gauges, sensors, instruments and pumps are not shown.

FIG. 3 shows an embodiment of a carbon capture and sequestration process and system integrating several subsystems, including the inflow and outflow streams to a power plant, as well as the streams between the subsystems. These include carbon capture assembly 100, solvent regeneration assembly 200, nitrogen liquefaction assembly 300 and the power production assembly 400. This last part can include coal-fired and biomass steam cycles, natural gas fueled combined cycles, landfill gas-fired or anaerobic digester-fired plants, and any other hydrocarbon fueled, $CO_2$-emitting power production systems.

$LN_2$ production occurs in nitrogen liquefaction assembly 300 with mostly $N_2$ as the feed gas. In one example, the $LN_2$ production stream at a 500 MW coal-fired power plant will be approximately 30,000 tons per day. That 30,000 tons per day includes about 0.9% argon, which is also valuable, and which is separated from the $LN_2$ and used to generate income. In a preferred embodiment, the $LN_2$ is divided into three portions. A first portion is sold as a high-value product to off-site end users, for refrigeration applications and as a product that is used in oil and gas fields to move such resources to (and up) the well casing.

A second portion is used to regenerate the methanol by cryogenic drying, as shown in FIG. 2. That same $N_2$, after it is vaporized by heat exchange, is sent as a high pressure stream into the steam cycle of a power plant, increasing the mass flow through the steam turbine, or to a separate hot gas expander which is generator-loaded, thus enhancing the power output by some 6.5%, without the use of additional fuel. The high-pressure of the $N_2$ stream is achieved by first pumping the $LN_2$ to pressure, and the heat is absorbed in the high-pressure stream through the various heat recovery steps shown in FIG. 2 and discussed herein.

Sources of heat provided by embodiments of the invention for warming the high-pressure $N_2$ vapor include the following: warm water-solvent solution 10 that leaves reaction vessel 101 on its way to regeneration, as shown in FIG. 1, where heat exchange occurs between $N_2$ stream 9 and water-solvent solution stream 10 in heat exchanger 201; warm $N_2$ leaving the reaction vessel 101, as shown in FIG. 1, where $N_2$ stream 9 is warmed by the methanol-containing $N_2$ stream 8 in solvent condenser 103; the remaining heat in the flue gas 1 after it gives up some of its heat in the hot distillation column 205; heat contained in the recovered water 4 from the hot distillation column 205; heat produced by the ionic reaction between the selected alkali 2 and the methanol 12 during the making of methoxide 5 in mixing vessel 102; the condensation of steam in the power cycle, normally performed by a cooling tower, which is replaced by the cold $N_2$ stream; and in natural gas fired, combined cycle power plants, the heat absorbed from using cold $N_2$ as a cooling stream to chill the ambient inlet air to the gas turbine.

A third portion of the daily $LN_2$ production is stored in one or more cryogenic storage tanks 307, and released during the peak power demand period to further enhance the power production cycle. The release of that stored energy occurs by first pumping the $LN_2$ to pressure, preferably using a cryogenic pump, then vaporizing it with waste heat from elsewhere in the process, then sending the high-pressure hot $N_2$ stream through a generator-loaded hot-gas expander. That power output will increase the peak period power output by another approximately 5%, which, combined with the 6.5% power increase produced during the rest of the day, yields a total power boost of about 11% during the peak output period when the power is most valuable. The $LN_2$ used for that power enhancement embodiment is preferably made at night using off-peak power, and its storage for later power release constitutes a utility-scale power storage mode, without batteries, fly wheels or compressed air cavern storage systems.

This storage and release mode, with outflow during peak power demand periods, constitutes a power storage strategy that converts low-cost liquid nitrogen produced as a byproduct of the $CO_2$ capture process and converts that recovered nitrogen stream into high-value peak period power. The generator-loaded hot gas expander that converts the hot, pressurized nitrogen gas into electric power may be the same expander that converts the first portion of nitrogen that was warmed in the methanol regeneration process.

Nitrogen stream 7 is already separated from the air that was initially used to combust the fuel used in the power plant 400 (with the $O_2$ content of the air used to combust the fuel), and is also separated from the $CO_2$ contained in the flue gas that resulted from the combustion of fuel in air. Any trace amounts of water and $CO_2$ remaining in the nitrogen stream 8 that leaves reaction vessel 101 can be removed by molecular sieve 305, preferably containing zeolite. The water and $CO_2$ content of the $N_2$ stream will be substantially less than that of ambient air, requiring a smaller mole sieve adsorber, or one that is regenerated less often.

Referring to FIG. 4, nitrogen liquefaction assembly 300 is shown in more detail. FIG. 4 illustrates $N_2$ liquefaction using a separate $N_2$ loop as the refrigerant, which cools the $N_2$ stream that leaves carbon capture assembly 100 in a cryogenic heat exchanger 306. $N_2$ stream 7 is first compressed to moderate pressures, e.g., approximately 80 psia, in several stages, as represented by multi-stage compressor 302, which is driven by a motor 301 connected to the compressor by a drive shaft 309. After heat recovery in one or more inter- and after-coolers 303, the compressed $N_2$ moves through molecular sieve 305. FIG. 4 shows several locations where the heat of compression is recovered in heat exchangers (inter- and after-coolers) and is used to provide heat for other portions of the carbon capture and sequestration process. The compressed $N_2$ stream is sent to cryogenic heat exchanger 306 where it is chilled to approximately −280° F. by heat exchange with the refrigerant $N_2$ streams, shown as 9. The chilling causes the stream to form a mostly liquid phase, which is sent through a pressure letdown/control valve 207 between cryogenic heat exchanger 306 and storage apparatus 307, preferably a cryogenic liquid storage tank in which the resultant $LN_2$ is stored.

The pressure letdown through valve 204 allows more than 90% of the deeply chilled $N_2$ 9 to enter the storage tank as a liquid, with less than 10% of the stream flashing as a dense, cold (approximately −280° F.) vapor 35. The vapor portion (flash gas) is allowed to leave the storage tank and is used as small portion of the refrigeration source in the main heat exchanger that chills the inlet $N_2$ stream. After giving up its cold to the inlet stream, flash stream 35 is further warmed by heat exchange with other streams (not shown in FIG. 4), sent to molecular sieve 305 as sweep gas to remove the water and $CO_2$ captured in the sieve, and then vented to the atmosphere through vent 308. That vent stream is benign because it contains mostly $N_2$ (the main component of air) with small amounts of water and $CO_2$.

The main refrigeration loop that liquefies the $N_2$ stream also uses dry $N_2$ (or dry air, or any other suitable fluid) as the refrigerant, but without mixing the refrigerant stream with the $N_2$ stream that is to be liquefied. That independent refrigeration loop consists of several stages of compression and several stages of expansion, (all on a single shaft 309 or separated on two or more shafts), where an electric motor 301 drives the compressor stages 302, and the expander stages 304 contribute work that causes the refrigeration, as described below. The single shaft configuration shown for the various stage compressors and expanders is just one illustrative example of such cryogenic refrigeration systems. Other layouts, with multiple shafts and variations on the location of compression and expansion functions can be designed by those skilled in the art.

The compressor stages take low-pressure "warmed" refrigerant that leaves cryogenic heat exchanger 306 (having deeply chilled the $N_2$ inlet stream) and bring the refrigerant stream to a high-pressure (e.g., approximately 800 psia) in several stages of compression, with the heat of compression recovered in inter- and after-coolers 303 for use elsewhere. The near-ambient temperature high-pressure refrigerant is then expanded in stages in multi-stage expander 304. Those expansions chill the refrigerant to approximately −300° F., but having reduced its pressure to approximately 80 psia. The approximately −300° F. refrigerant cools an approximately 50° F. $N_2$ stream to approximately −280° F. in heat exchanger 306. In turn, the inbound $N_2$ stream 7 warms the refrigerant to approximately 40° F., requiring it to be re-compressed and cooled by expansion, in a continuous loop, as described above. The cycle described here may have variations, in addition to the possible variations mentioned above. For example, the inlet $N_2$ may be compressed to a higher pressure, in various stages, yielding a different proportion of liquid to flash that will enter the $LN_2$ storage tank, and yielding different amounts of recoverable heat of compression. An absorption chiller driven by waste heat of compression and other waste heat sources from embodiments of the invention may provide pre-cooling of the $N_2$ stream.

Similar power enhancement is possible at natural gas-fired, combined cycle power plants, but with the following differences: the $N_2$ stream is a larger portion of the flue gas stream relative to the $CO_2$ stream, because natural gas-fired power plants produce less $CO_2$; and cold $N_2$ can first be sent to cool the inlet air of the gas turbine, and then, once the $N_2$ is warmed up, it can be sent to pick up more heat from waste heat sources in embodiments of the invention, and then to the steam portion of the combined cycle.

The liquefaction cycle requires power input to motors 301 at the $N_2$ stream compressor and at the refrigerant stream compressor, as well as minor amounts of power input for various pumps, instruments and valves. However, that power requirement is substantially offset by the power enhancement steps described herein, and more than compensated for by the total value of the carbonate, the liquid nitrogen and liquid argon sales, the recovered $H_2$, and the possible recovery of iron oxide from the ash and any other byproducts that may be made from the $N_2$ stream that is separated from the flue gas. In some embodiments, $LN_2$ liquefaction will likely be done only during off-peak power demand periods, using lower-value power to produce enough $LN_2$ for use in the methanol regeneration and power enhancement sequences, and additional $LN_2$ for off-site sales. If a cold distillation column is included (not shown in FIG. 4), then liquid argon can be drawn off from the $LN_2$, yielding another income stream.

Thus, it is seen that carbon capture and sequestration systems and methods are provided. It should be understood that any of the foregoing configurations and specialized components or chemical compounds may be interchangeably used with any of the systems of the preceding embodiments. Although preferred illustrative embodiments of the present invention are described hereinabove, it will be evident to one skilled in the art that various changes and modifications may be made therein without departing from the invention. It is intended in the appended claims to cover all such changes and modifications that fall within the true spirit and scope of the invention.

What is claimed is:

1. A method of capturing and sequestering carbon dioxide, comprising:
    mixing a substantially non-aqueous solvent and an alkali such that the solvent and alkali form a solvent suspension;
    mixing water and a flue gas containing carbon dioxide with the solvent suspension in a reaction vessel such that a reaction occurs, the reaction resulting in the rapid formation of a carbonate, water and heat, the resulting water forming a solution with the solvent, the resulting carbonate being essentially free of organo-metallic products and substantially non-aqueous;
    the resulting carbonate precipitating out of solution, requiring no further chemical processing steps, falling toward the bottom of the reaction vessel, and accumulating at the bottom of the reaction vessel together with some substantially non-aqueous solvent.

2. The method of claim 1 further comprising the steps of:
    continuously removing a portion of the solution of water and solvent from the reaction vessel;
    separating the water from the solvent;
    introducing additional alkali to the separated solvent;
    re-mixing the separated solvent with the additional alkali such that the solvent and additional alkali form a solvent suspension;
    providing additional flue gas containing carbon dioxide; and
    returning a portion of the separated water to the solvent suspension to continue the reaction.

3. The method of claim 2 wherein the precipitated carbonate is mechanically removed from the reaction vessel.

4. The method of claim 1 wherein the solvent is an alcohol.

5. The method of claim 4 wherein the alcohol is methanol.

6. The method of claim 5 wherein the alkali reacts with the methanol to form methoxide.

7. The method of claim 6 further comprising introducing ash into the solvent, wherein one or more constituents of the ash are alkalis and the ash contains one or more metal oxides including iron oxide.

8. The method of claim 2 wherein separating the water from the solvent includes chilling the solution of water and solvent in a cryogenic drying vessel such that the water falls substantially to the bottom of the cryogenic drying vessel and the solvent rises substantially to the top of the cryogenic drying vessel.

9. The method of claim 2 wherein separating the water from the solvent includes the steps of: applying heat to the solution of water and solvent, using a partial vacuum to draw off vaporous solvent from a hot distillation vessel, and condensing the vaporous solvent.

10. The method of claim 2 wherein carbon dioxide and water react to form carbonic acid.

11. The method of claim 10 further comprising introducing ash into the solvent, one or more constituents of the ash being alkalis and the ash containing one or more metal oxides including iron oxide, wherein the carbonic acid reacts with the alkalis to substantially neutralize the alkalis.

12. The method of claim 11 wherein the reaction of carbonic acid and the alkalis results in a non-alkaline stream comprising one or more carbonates, sand and iron oxide.

13. The method of claim 2 wherein the reaction temperature is less than about 150 degrees Fahrenheit.

14. A method of separating chemical constituents of flue gas, comprising:
- mixing a substantially non-aqueous solvent and an alkali such that the solvent and alkali form a solvent suspension;
- introducing water and a flue gas containing carbon dioxide and nitrogen to the solvent suspension;
- contacting the alkali in the solvent suspension with the water and the carbon dioxide in the flue gas in a reaction vessel such that a reaction occurs, the reaction resulting in the rapid formation of a substantially non-aqueous carbonate, water and heat, the carbonate being essentially free of organo-metallic products, and the resulting water forming a solution with the solvent;
- removing the solution of water and solvent from the reaction vessel such that the resulting carbonate is substantially non-aqueous; and
- substantially liquefying a portion of the nitrogen by compressing and chilling the nitrogen.

15. A method of capturing or sequestering carbon dioxide, comprising:
- mixing methanol and an alkali such that the methanol and alkali form a solvent suspension;
- mixing water and a flue gas containing carbon dioxide with the solvent suspension such that a reaction occurs, the reaction resulting in the rapid formation of a substantially non-aqueous carbonate, water and heat, the carbonate being essentially free of organo-metallic products.

16. The method of claim 15 wherein the alkali reacts with the methanol to form methoxide.

17. The method of claim 16 further comprising introducing ash into the solvent, wherein one or more constituents of the ash are alkalis and the ash contains one or more metal oxides including iron oxide.

18. The method of claim 15 wherein the resulting water forms a solution with the methanol and the resulting carbonate precipitates out of solution, requiring no further chemical processing steps, falls toward the bottom of the reaction vessel, and accumulates at the bottom of the reaction vessel together with some methanol.

19. The method of claim 18 further comprising the steps of:
- continuously removing a portion of the solution of water and methanol from the reaction vessel such that the resulting carbonate is substantially non-aqueous;
- separating the water from the solvent;
- introducing additional alkali to the separated solvent;
- re-mixing the separated solvent with the additional alkali such that the methanol and additional alkali form a solvent suspension;
- providing additional flue gas containing carbon dioxide; and
- returning a portion of the separated water to the solvent suspension to continue the reaction.

20. The method of claim 16 wherein the water content of the methanol does not exceed about 10% by volume.

* * * * *